July 7, 1959 H. KUNCKEL 2,894,075

TELEPHONE SET

Filed March 27, 1956 2 Sheets-Sheet 1

Inventor
HEINZ KUNCKEL

By Ostrolenk, Faber, Gerb & Soffen

ATTORNEYS

July 7, 1959

H. KUNCKEL 2,894,075

TELEPHONE SET

Filed March 27, 1956

2 Sheets-Sheet 2

Inventor
HEINZ KUNCKEL

By Ostrolenk, Faber, Gerb & Soffen

ATTORNEYS

United States Patent Office 2,894,075
Patented July 7, 1959

2,894,075

TELEPHONE SET

Heinz Kunckel, Berlin-Dahlem, Germany

Application March 27, 1956, Serial No. 574,215
Claims priority, application Germany April 5, 1955
5 Claims. (Cl. 179—81)

The invention relates to a telephone set, particularly to a portable type having a local battery. It is an object of the invention to provide a telephone set, particularly a portable one, which is particularly light in weight. This is achieved by the provision of a circuit which enables the use of components that are particularly light in weight whereas the usual components of known portable telephone sets are eliminated, which components are in many cases rather heavy. This relates particularly to the hand generator, the bell, and the microphone battery. The telephone set according to the invention is specifically characterized by the following features:

The previous carbon microphone is replaced by a microphone which operates without a battery. For this reason amplification is required to achieve an adequate transmitting level. That amplification is provided by a simple light-weight amplifier arrangement, e.g. by a one-stage transistor amplifier. In this case the volume loss of the batteryless microphone with single-stage amplification exceeds that of a carbon microphone by about 1 neper but only one fourth to one fifth of the direct current power is taken from the battery. This means that the battery for the transistor amplifier can be much smaller than for a carbon microphone, for the same life.

The use of the amplifier affords another important advantage: According to the invention the amplifier stage can be caused by very simple means to oscillate to operate as an audiofrequency ringer. In similarly constructed called station a sensitive receiver (so-called loud speaking receiver) may be energized by the audio-frequency ringing current to produce a loud ringing signal. This eliminates the need for a hand generator and bell in the calling station. Compared to known sets having a ringing inductor, telegraphy is now possible because the switching of the amplifier to form an audiofrequency generator can be effected with a suitable key, e.g. a Morse key.

The circuit and operation of a telephone set according to the invention will be described hereinafter with reference to Figs. 1 and 2 of the accompanying drawings.

Figure 1:
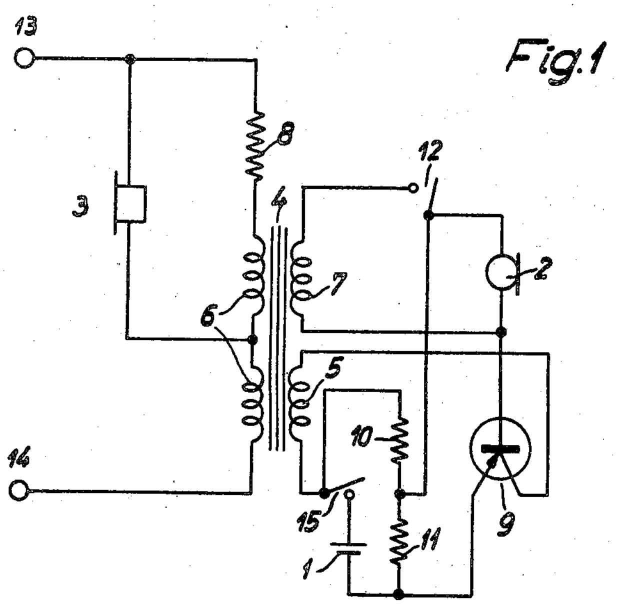
Fig. 1 is a circuit diagram of a telephone set according to the invention, for two-way conversation.

In Fig. 1, numeral 1 is a battery, 2 a microphone operating without battery, 3 a receiver, 4 a repeating coil having the windings 5, 6 and 7; 8 is a balancing resister, 9 a transistor, 10 and 11 are voltage dividing resistors, 12 is a calling key and 13 and 14 are the line terminals. 15 is the cut-in key.

In telephone operation the microphone 2, which may be an electromagnetic microphone, feeds the emitter-base input of the transistor 9. The voltage divider consisting of the resistors 10, 11 applies the proper bias to the base. The collector output current flows through the winding 5 of the repeating coil 4. The tapped winding 6 of the repeating coil, the receiver 3, the balancing resistor 8 and the called station connected to the line terminals 13, 14 form a known compensating circuit to avoid or reduce side tone.

The voltage and current values for the transistor 9 are adjusted so that when connected to a sufficiently sensitive microphone 2 it will deliver to the called station about the same speech power as a carbon transmitter. Upon operation of the talking key 12 the feedback winding 7 of the repeating coil 4 is connected parallel to the microphone 2 to the input of the transistor stage 9. The amplifier stage 9 is caused to oscillate and delivers an audiofrequency voltage to the called station through the windings 5, 6 and the lines 13, 14. In the calling station the calling current is heard in the microphone 2, which functions also as a receiver. This is necessary particularly in telegraphy, because the telephone 3 of the same station receives no or only very little energy owing to the side tone damping circuit and it may be desirable to place the handset aside during telegraphy operation. On the other hand, the audiofrequency call is reproduced with large volume in the receiver of the similarly constructed called station.

The battery circuit is closed only upon operation of the cut-in key 15, which is suitably accommodated in the handset.

Figure 2:
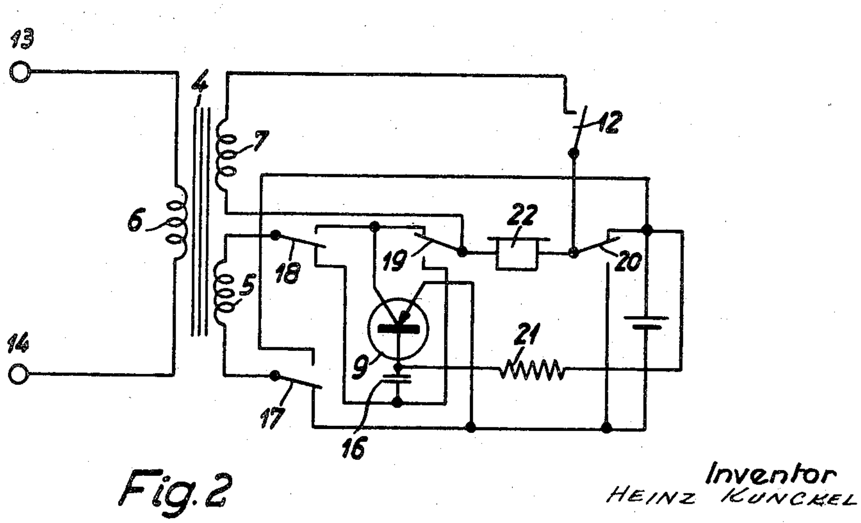
Fig. 2 is a modified circuit for simplex operation with increased volume.

In Fig. 2 the same reference numerals as in Fig. 1 are used for corresponding parts. In addition thereto 16 is a blocking capacitor, 17–20 are four contacts of a talking key, which may be combined with the switch hook, 21 is the series-connected base resistor of the transistor and 22 is a combined microtelephone.

The circuit of Fig. 2 comprises only one transducer 22 as a combined microtelephone. For this reason only simplex operation rather than duplex operation is possible. Both the outgoing and incoming speech currents will be amplified in the transistor amplifier stage. Upon removal of the handset the switch hook will operate the change-over contacts 20 and 18 to move them into the position shown in Fig. 2. The microphone switch and the hook switch form suitably a mechanical unit. The combined talking key and switch hook may be designed to have a clicked-in rest position and two operating positions for listening and talking, respectively, the switch being spring-biased to return to the listening position after it has been pressed into the talking position. In that listening position, shown in Fig. 2, the winding 5 of the repeating coil 4 is connected to the emitter-base input of the transistor 9 and the microtelephone 22 lies in the collector circuit. Thus the incoming speech currents will be amplified and will be reproduced in the microphone 22. The current bias is applied to the base of the transmitter through the series resistor 21. For talking, the talking key is operated, whereby all four contacts 17–20 are shifted from the position shown into the other operating position. Now the microtelephone 22, acting as a microphone, is connected by way of contacts 20 and 19 to the input of the transistor and the repeating coil winding 5 lies in the collector circuit. The amplified speech currents flow through the winding 6 of the repeating coil 4 and the line terminals 13, 14 to the called station (not shown). To transmit an audiofrequency call the calling key 12 is operated whereby the repeating coil winding 7 is connected in parallel to the microtelephone 22 to provide a feedback for the transistor stage. Thereby an audiofrequency signal will be produced whether the station is in talking or listening condition because it makes no difference for the operation of the transistor stage as an oscillator whether the feedback winding 7 is connected to the input or output of the amplifier 9. The calling signal can be heard in the microtelephone 22. The windings 5 and 7 may be dimensioned to provide for different volumes of sound depending on the position of the talking key.

The circuit shown in Fig. 2, having only one transducer 22, permits of the use of a handset which has a combined transmitting and receiving unit only at the mouth end or at the ear end whereas the sound is transmitted by way of an acoustic line from the mouth to the unit or from the latter to the ear. In the former case a mouthpiece with acoustic amplification may be employed.

Figures 3, 4:
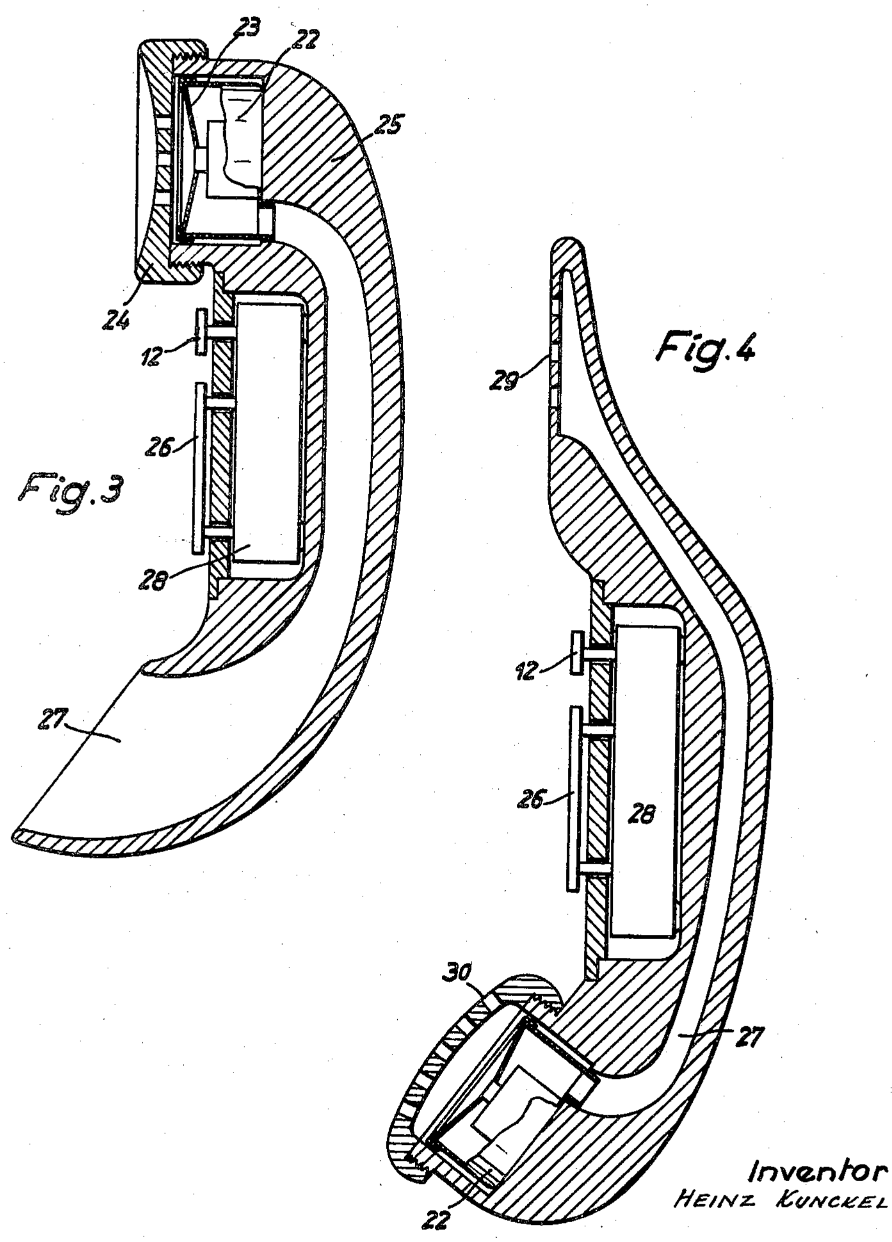
Figs. 3 and 4 show exemplary embodiments of the construction of a telephone set according to the invention.

Fig. 3 shows a simplified exemplary embodiment of such a design in a longitudinal sectional view of the construction of the telephone set. In Fig. 3, 22 is the combined microtelephone, 23 the diaphragm of the microtelephone, 24 the earpiece, 25 the handset body or housing, 12 the calling key, 26 the combined talking key and hook switch operating the contacts 17–20 (Fig. 2), 27 the sound duct serving as a speech input and 28 the amplifier space serving for accommodating the transistor 9 and the other circuit components. In that arrangement the speech sound is supplied through the sound-amplifying funnel-shaped sound duct 27 from the rear to the combined microtelephone 22 and acts on the rear of the diaphragm 23. The microtelephone is, e.g., of the dynamic or electromagnetic type or may be a piezo transducer and supplies a voltage, which is amplified by the amplifier unit accommodated in the amplifier space 28 and is then delivered to the line, whose connections are not shown. In the listening position the sound comes from the front side of the diaphragm 23 of the microtelephone 22 through the holes of the earpiece 24 to the ear. The calling key 12 and the switch 26 operate the contacts accommodated in the amplifier space 28, which are also not shown in Fig. 3. The switches 12 and 26 are arranged for easy operation with the free fingers of the hand which holds the set. An incoming call is emitted from the front and rear sides of the diaphragm 23 and is acoustically amplified by the sound duct 27.

When the microtelephone 22 is arranged at the mouth end of the handset, the earpiece of the handset may be of particularly flat design so that the same can be pushed also below a steel helmet. Fig. 4 shows a simplified sectional view of a telephone set of that construction. In this case the sound duct 27 passes the incoming sound, emitted by the rear side of the diaphragm 23, through the sound holes 29 in the end wall of the sound duct to the ear. It is apparent that the upper part of the handset is very flat owing to the absence of the receiver. In other respects the accommodation of the amplifier unit and the arrangement of the keys is similar to Fig. 3. A difference resides in the direct talking into the combined microtelephone through the holes in the mouthpiece 30.

It is obvious that various other circuits are possible which employ the transistor as an amplifier in the talking or listening circuit and also as an audiofrequency generator. In accordance therewith the invention is not restricted to the circuits shown in Figs. 1 and 2. The construction of a telephone set according to the invention may also be varied. More particularly, all parts may be accommodated in the handset, as is shown in Figs. 3 and 4 or the amplifier components and terminals may be accommodated in a separate casing or in a carrying bag, which may also serve to receive the separate handset.

I claim:

1. A telephone circuit comprising a transistorized amplifier circuit, a sound powered microphone, a local battery, a repeating coil, a first switch, a first means; said microphone being connected to the input of said amplifier circuit; said repeating coil connected to the output of said amplifier circuit; said first switch operable to a first and a second position; said first means being operatively connected to said first switch; said switch when in said first position operatively connecting said first means to said amplifier circuit and when in said second position operatively disconnecting said first means from said amplifier circuit; said first means when connected to said amplifier circuit causing said amplifier to generate an audio frequency oscillation for ringing purposes as long as said first switch remains in said first position; said battery being operatively connected by connection means to said transistorized amplifier circuit to supply all operating power for said telephone circuit during both amplification and ringing.

2. The telephone circuit as set forth in claim 1 in which the first means comprises a winding of the repeating coil; said winding being connected in parallel with the microphone when the first switch is in its first position.

3. A telephone set comprising a transistorized amplifier circuit, a microtelephone, a local battery, a repeating coil, a first switch, a second switch; said microtelephone comprising the combination of a receiver and a sound powered microphone; said second switch operatively connected to said repeating coil and said microtelephone; said second switch operable to a first and a second position; said repeating coil being connected to the output of said amplifier circuit and said microtelephone being connected to the input of said amplifier circuit for talking purposes when said second switch is in said first position; said microtelephone being connected to said output and said repeating coil being connected to said input for listening purposes when said second switch is in said second position; said first switch operable to a first and a second position and operatively connected to a winding of said repeating coil; said first switch when in said first position connecting said winding in parallel with said microtelephone and when in said second position disconnecting said winding from said microtelephone; said winding causing said amplifier circuit to generate an audio frequency oscillation for ringing purposes as long as said first switch remains in said first position and said second switch is in either said first or said second position; said battery being operatively connected to said transistorized amplifier circuit to supply all operating power requirements for amplification and ringing.

4. The telephone set as set forth in claim 3 also including a housing having an earpiece at one end and a mouthpiece at the other end with the microtelephone positioned within said housing at one of the ends thereof and the remaining components of said telephone set positioned at a point intermediate the ends of said housing; said housing including a passage acoustically connecting the other end of the housing to said microtelephone.

5. The telephone set as set forth in claim 4 in which the microtelephone is positioned at the mouthpiece end of the housing and the earpiece is substantially 10 mm. in thickness.

References Cited in the file of this patent

UNITED STATES PATENTS

| | | |
|---|---|---|
| 1,495,295 | Fletcher | May 27, 1924 |
| 1,752,498 | Mathes | Apr. 1, 1930 |
| 2,376,367 | Leibe | May 22, 1945 |
| 2,686,835 | Gottlieb | Aug. 17, 1954 |
| 2,762,867 | Meacham | Sept. 11, 1956 |
| 2,808,461 | Thomas | Oct. 1, 1957 |

FOREIGN PATENTS

| | | |
|---|---|---|
| 743,024 | Great Britain | Jan. 4, 1956 |

OTHER REFERENCES

TM 11–2059 War Dept. Technical Manual, Dec. 9, 1944, Telephone TP–9 (copy found in Div. 16), pages 10–14.